US010260270B2

(12) United States Patent
Worner

(10) Patent No.: US 10,260,270 B2
(45) Date of Patent: Apr. 16, 2019

(54) MECHANISM FOR INFLUENCING THE OPENING AND/OR CLOSING MOVEMENT OF A WING OF A DOOR OR WINDOW

(71) Applicant: GEZE GmbH, Leonberg (DE)

(72) Inventor: Benjamin Worner, Korntal-Munchingen (DE)

(73) Assignee: Geze GmbH, Leonberg (DE)

(*) Notice: Subject to any disclaimer, the term of this patent is extended or adjusted under 35 U.S.C. 154(b) by 0 days.

(21) Appl. No.: 15/622,281

(22) Filed: Jun. 14, 2017

(65) Prior Publication Data

US 2017/0362874 A1    Dec. 21, 2017

(30) Foreign Application Priority Data

Jun. 15, 2016   (DE) .................... 10 2016 210 600

(51) Int. Cl.
| | |
|---|---|
| E05F 15/02 | (2006.01) |
| E05F 15/619 | (2015.01) |
| E05F 15/622 | (2015.01) |
| H02K 7/116 | (2006.01) |
| H02K 7/14 | (2006.01) |
| E05F 15/63 | (2015.01) |

(52) U.S. Cl.
CPC .......... *E05F 15/619* (2015.01); *E05F 15/622* (2015.01); *H02K 7/116* (2013.01); *H02K 7/14* (2013.01); *E05F 2015/631* (2015.01); *E05Y 2600/41* (2013.01); *E05Y 2600/456* (2013.01); *E05Y 2600/46* (2013.01); *E05Y 2900/132* (2013.01); *E05Y 2900/148* (2013.01)

(58) Field of Classification Search
CPC ...... E05F 15/619; E05F 15/622; H02K 7/116; H02K 7/14; E05Y 2900/132

USPC .................... 49/340, 341, 343, 346
See application file for complete search history.

(56) References Cited

U.S. PATENT DOCUMENTS

| | | | | |
|---|---|---|---|---|
| 8,773,237 B2* | 7/2014 | Burris | ............... | G05B 19/0426 |
| | | | | 16/49 |
| 9,052,184 B2* | 6/2015 | Gutzmer | ............... | B66B 13/143 |
| 9,869,117 B2* | 1/2018 | Houser | ............... | E05F 15/611 |
| 2009/0093913 A1* | 4/2009 | Copeland, II | ............ | E05F 3/12 |
| | | | | 700/282 |
| 2012/0245800 A1* | 9/2012 | Koberstaedt | ............ | B60J 5/101 |
| | | | | 701/49 |

(Continued)

FOREIGN PATENT DOCUMENTS

CA           2905424 A1 *  9/2014  ............ E05F 15/611

*Primary Examiner* — Jerry E Redman
(74) *Attorney, Agent, or Firm* — Steven M. Shape; Dennemeyer & Associates

(57) ABSTRACT

A mechanism for influencing the opening and/or closing movement of a wing of a door, a window or the like comprises a sliding arm disposed between the wing and a fixed frame, being mounted rotatably on one hand on the wing or frame and on the other hand, guided by a sliding block in a sliding rail disposed on the frame or wing. Here, energy conversion means are assigned to the sliding rail and/or the sliding block, through which the kinetic energy of the sliding block can be converted to electrical energy, and electrical energy produced in this way can be converted to mechanical energy, in order to supply at least one electrical component with electric current, to generate a braking torque and/or to drive the sliding arm, at least in sections, especially to support the closing and/or opening movement.

16 Claims, 4 Drawing Sheets

(56) References Cited

U.S. PATENT DOCUMENTS

Figure 1:
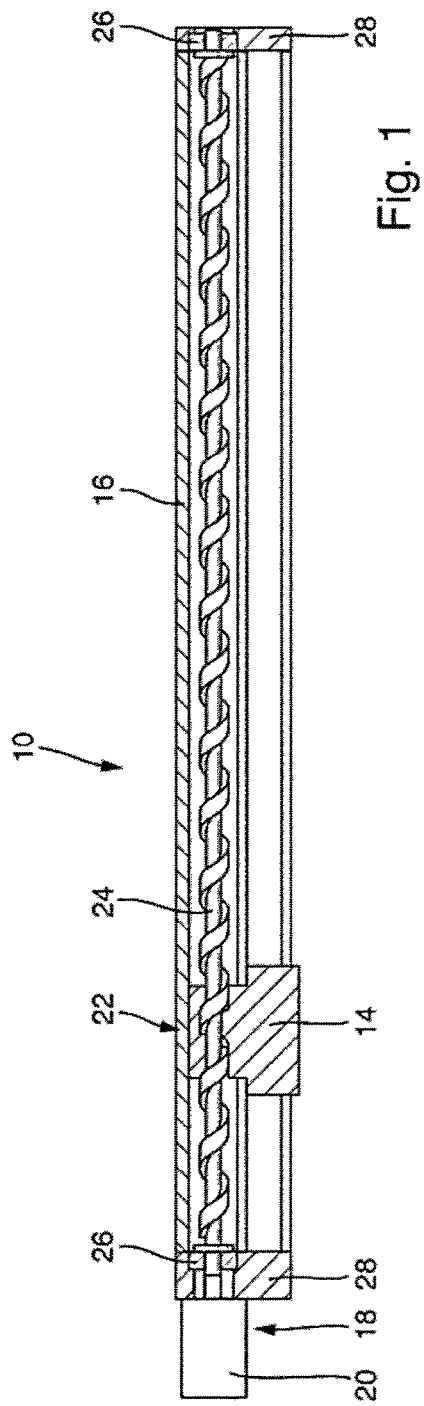

| | | | | |
|---|---|---|---|---|
| 2014/0346997 A1* | 11/2014 | Salutzki | ............... | E05F 3/224 |
| | | | | 318/628 |
| 2016/0311383 A1* | 10/2016 | Lange | ............... | E05B 81/90 |
| 2017/0201140 A1* | 7/2017 | Cole | ............... | E06B 9/13 |
| 2017/0248183 A1* | 8/2017 | Strobel | ............... | F16D 65/186 |
| 2017/0362873 A1* | 12/2017 | Hucker | ............... | E05F 15/603 |
| 2017/0362874 A1* | 12/2017 | Worner | ............... | E05F 15/619 |
| 2017/0362875 A1* | 12/2017 | Worner | ............... | E05F 15/619 |
| 2018/0051502 A1* | 2/2018 | Roos | ............... | E05F 15/622 |
| 2018/0069454 A1* | 3/2018 | Greene | ............... | H02K 7/1861 |
| 2018/0148970 A1* | 5/2018 | Houser | ............... | E05F 15/60 |

* cited by examiner

MECHANISM FOR INFLUENCING THE OPENING AND/OR CLOSING MOVEMENT OF A WING OF A DOOR OR WINDOW

The invention relates to a mechanism for influencing the opening and/or closing movement of a wing of a door, a window or the like, with a sliding arm disposed between the leaf and a fixed frame, said arm being rotatably mounted on pivot bearings on one side and on the other side, being guided by a sliding block in a sliding rail disposed on the frame or wing.

The previously known mechanisms of the initially mentioned type include in particular hydraulic drives such as door closers with a working piston guided movably in a housing, acted upon in the closing direction by a spring unit, said piston interacting with a drive shaft, with which the sliding arm is coupled irrotatably in the vicinity of its end facing away from the sliding block. The drive may optionally be connected to a wing of the door or to the fixed frame. Correspondingly, the sliding arm is braced against the frame or the wing, forming a connection between the pivoting movement of the wing and the drive.

In the conventional hydraulic drives up to now, for example door closers, in which the housing is filled with a damping medium and the working piston is acted upon by a spring unit, the spring unit is compressed during a rotary movement of the drive shaft upon opening the wing, so that it can serve as an energy store for self-contained closure of the wing. As a rule, the interior space of the housing is divided into several chambers by the working piston. Between these chambers, in the case of the previously usual hydraulic drives or door closers, channels with assigned regulating valves for influencing the damping medium flowing back and forth between the chambers of the housing are disposed, serving to control the drive behavior.

The hydraulic components needed in the previously usual hydraulic drives or door closers for controlling the drive behavior are relatively complicated, resulting in correspondingly high manufacturing costs.

The invention is based on the task of specifying a mechanism of the initially mentioned type with which the above-mentioned problems are eliminated. Thus, using the simplest possible design and correspondingly cost-advantageous manufacturing, in particular, simpler and more versatile control of the opening and/or closing behavior of the mechanism is to be guaranteed.

The task is accomplished according to the invention with a mechanism having the features of claim Preferred embodiments of the mechanism according to the invention will be apparent from the sub claims, the description below and the drawing.

The mechanism according to the invention for influencing the opening and/or closing movement of a wing of a door, a window or the like comprises a sliding arm, disposed between the wing and a fixed frame, which on one hand is mounted rotatably on the wing or frame and on the other hand, is guided by a sliding block in a sliding rail disposed on the frame or wing. At the same time, energy conversion means are assigned to the sliding rail and/or the sliding block, through which the mechanical energy of the sliding block can be converted to electrical energy, and electrical energy produced in this way can be converted to mechanical energy, in order to supply at least one electrical component with electric current, to generate a braking torque and/or to drive the sliding arm, at least in sections, especially to support the closing and/or opening movement.

Based on this configuration, with a simpler structure and the possibility for correspondingly more cost-advantageous fabrication, simpler and more versatile control of the opening and/or closing behavior of the mechanism is guaranteed. The hydraulic components previously required especially for damping the closing movement of the wing can be dispensed with. Now it is also possible, for example, to influence or control the closing time characteristics electrically. The electrical energy generated by the energy conversion means during the opening and/or closing of the wing can especially be used to supply at least one electrical component with electric current, to generate a braking moment and/or to drive the sliding block at least in sections to support the closing and/opening movement. In the latter case the electrical energy, stored temporarily if desired, may be used for example to strengthen the closing force.

Preferably the energy conversion means comprise an electrical generator/motor unit that can be operated as both a generator and a motor, as well as a gear drive, integrated in the sliding rails and/or in the sliding rail, over which the sliding block is coupled with the electric generator/motor unit.

In the generator drive, for example, a rotor of the electric generator/motor unit can be mechanically driven via the sliding block, so that electrical energy is stored in the coils of the stator of the electric generator/motor unit. With this, during generator operation, at least one electrical component can be directly supplied with power. To supply a respective electrical component with power, electrical energy previously generated by the generator/motor unit and stored temporarily may also be used. If, for example, current is conducted over a bypass to the generator/motor unit, this creates a braking torque that is transmitted over the sliding block, so that the wing is electrically damped. Temporarily stored electrical energy can also be used to drive the motor and to support the opening movement when opening the wing. With a corresponding increase in the closing force, for example, it is possible to ensure that the wing is reliably closed.

According to a further preferred alternative embodiment of the mechanism according to the invention, the gear drive comprises a threaded shaft mounted rotatably in the sliding rail. Advantageously in this process the sliding block cooperates with the threaded shaft in the manner of a spindle nut. When the sliding block is moved, it sets the threaded shaft into rotation. The rotary movement is transferred to the generator/motor unit. Conversely, the sliding block can be acted upon by the generator/motor unit by way of this threaded shaft.

The thread of the threaded shaft can be interrupted in sections for corresponding free-running.

An alternative embodiment of the mechanism according to the invention is characterized by the fact that the electrical generator/motor unit is integrated in the sliding block and the gear drive comprises gear teeth disposed in the sliding rail, with which a gear wheel or the like supported rotatably in the sliding block, coupled with the electrical generator/motor unit meshes.

The gear wheel supported rotatably in the sliding block can especially form part of a worm drive disposed between the teeth of the sliding rail and an output shaft and/or a drive shaft of the electrical generator/motor unit.

In particular, the worm drive can comprise the gear wheel supported rotatably in the sliding block as a worm wheel and a helical screw provided on an output shaft and/or a drive shaft of the electrical generator/motor unit, with which the gear wheel or worm wheel engages.

For temporarily storing the electrical energy generated by the energy conversion means, an energy storage unit of any desired type and/or a rechargeable electrical energy storage unit, for example a capacitor, a battery pack and/or the like may be provided. As was previously mentioned, the temporarily stored electrical energy can be used, for example, to drive the motor and to support the opening or closing movement of the wing during its opening and/or closing movement. Alternatively, or additionally, the temporarily stored electrical energy can also serve for supplying any desired electrical components with electric current.

It is also especially advantageous if the electric generator/motor unit comprises a gear drive motor/generator. Correspondingly, the generator/motor unit can comprise a combination of a generator/motor unit that can also be operated as a motor and a gear drive.

According to an advantageous practical embodiment of the mechanism according to the invention, the gear drive is designed such that in at least one direction of movement of the wing, free-wheeling occurs in a section between the sliding block and the energy conversion means. For example, if the sliding block is coupled with the energy conversion means over a threaded spindle, the tooth system of the threaded spindle can be interrupted in sections to produce the respective freewheeling.

According to an additional preferred practical embodiment of the mechanism according to the invention, this comprises an electronic control unit, over which the electrical generator/motor unit and/or at least one other component can be actuated.

Advantageously the electrical generator/motor unit can be actuated over the electronic control unit to influence the closing and/or opening movement of the wing.

In the area of its end away from the sliding block, the sliding arm is preferably connected irrotatably with a drive shaft of a drive. The drive can especially comprise a piston interacting with the drive shaft and acted upon by a spring unit in the closing direction.

Advantageously the gear drive is designed in such a manner, and/or the electric motor/generator unit can be actuated in such a manner, that in at least one movement direction of the wing, free-wheeling takes place in sections between the sliding block and the energy conversion means.

Through corresponding actuation of the electric generator/motor unit via the electronic control unit, the drive behavior, especially the closing time characteristics, strengthening of the closing force or the like, can be controlled in the desired manner.

For example, the electronic control unit can comprise at least one microcontroller. A microcontroller of this type can be easily programmed in a variable manner and thus optimally adapted to the respective circumstances and/or the respective desired behavior of the opening and/or closing movement of the wing.

For example, the electronic control unit can be connected to at least one rotary pulse generator, at least one scanner, at least one switch, at least one sensor and/or the like. Here, the respective connection may be wired and/or wireless.

It is especially advantageous if the electronic control unit comprises at least one communication interface for wired and/or wireless communication.

Through the energy conversion means, as the respective electrical component, for example, power can be supplied to the electronic control unit, at least one electrical valve connected to the drive, at least one sensor, at least one signal generator, at least one lighting element, an electrical drive unit connected to the drive and/or the like. Alternatively, or additionally, the energy conversion means can be used for supplying electric current to any desired other or additional electrical components.

Figure 2:
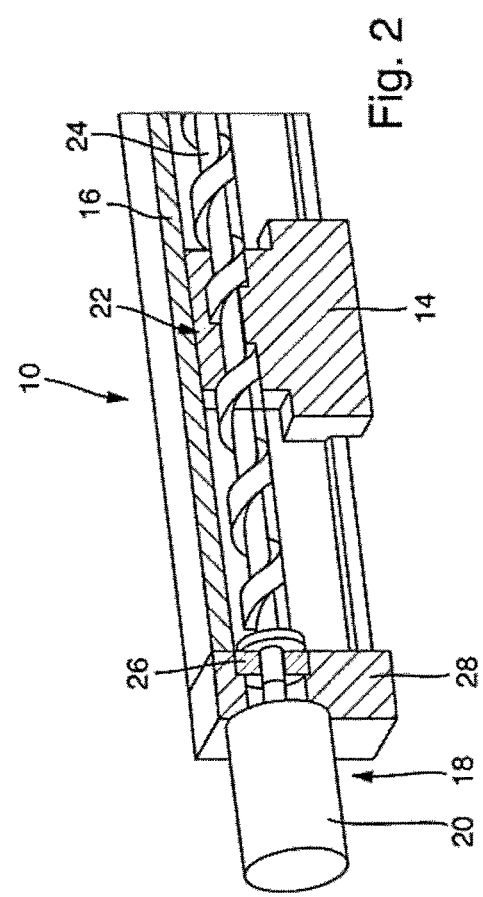
Figure 3:
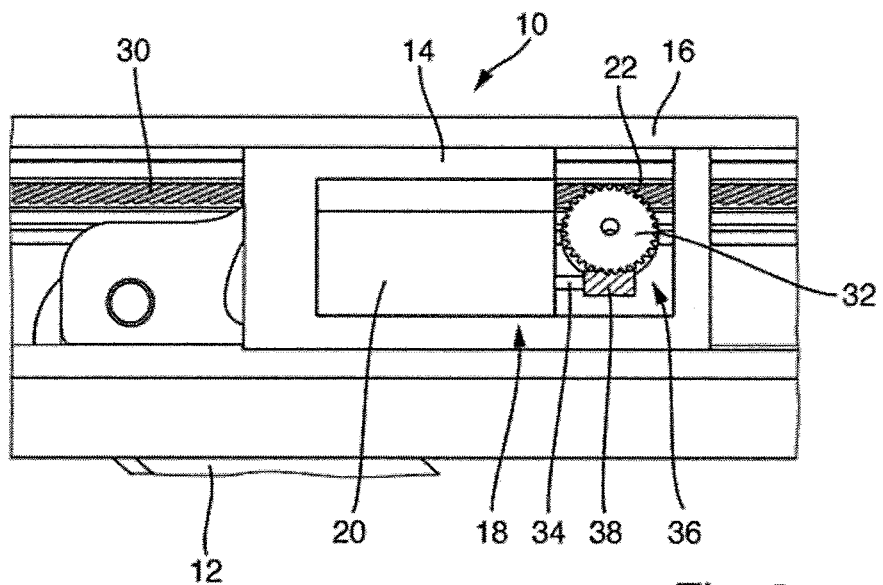
Figure 4:
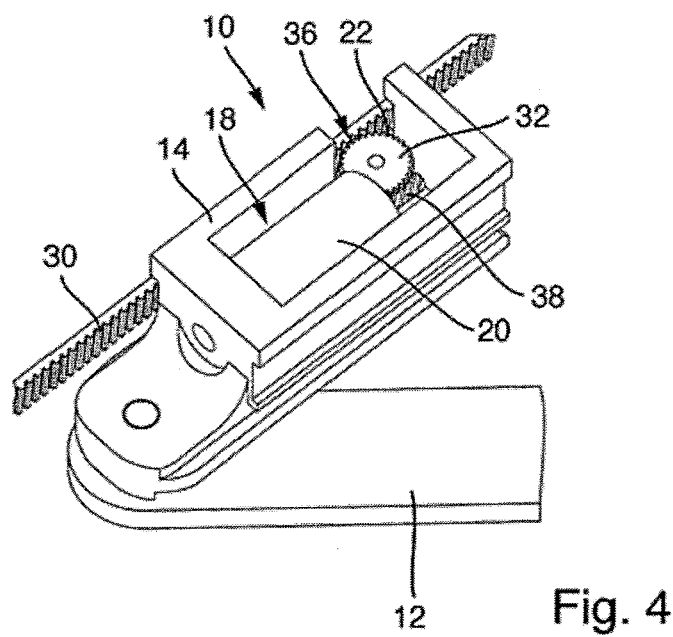

In the following, based on exemplified embodiments, the invention will be explained in further detail with reference to the drawing; this shows the following:

FIG. 1 a schematic, partially sectional representation of an exemplified embodiment of a mechanism according to the invention supplied with a threaded spindle for influencing the opening and/or closing movement of a wing of a door, a window or the like, and FIG. 2 an enlarged schematic, perspective and partially cut-away representation of an exemplified embodiment of part of the mechanism according to FIG. 1, FIG. 3 a schematic partial representation of an exemplified embodiment of a mechanism according to the invention with a generator/motor unit integrated in the sliding block, FIG. 4 a schematic partial view of the sliding block according to FIG. 3

Figure 5:
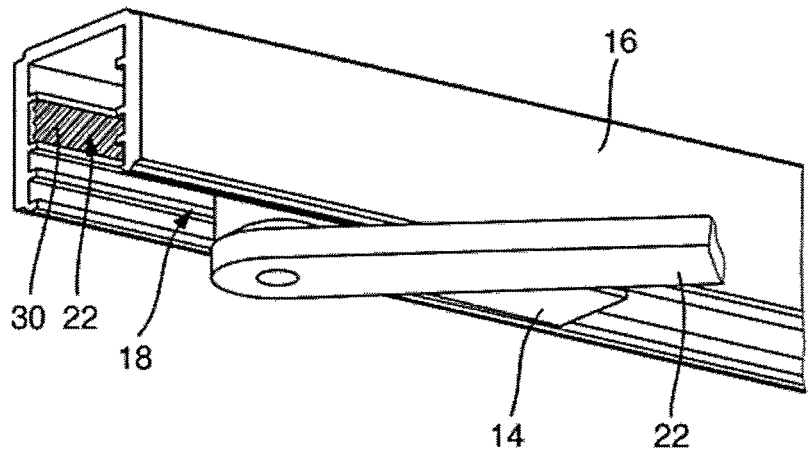
Figure 6:
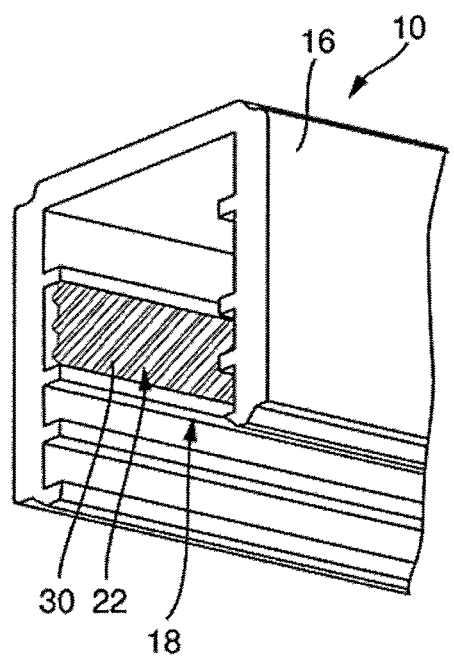
Figure 7:
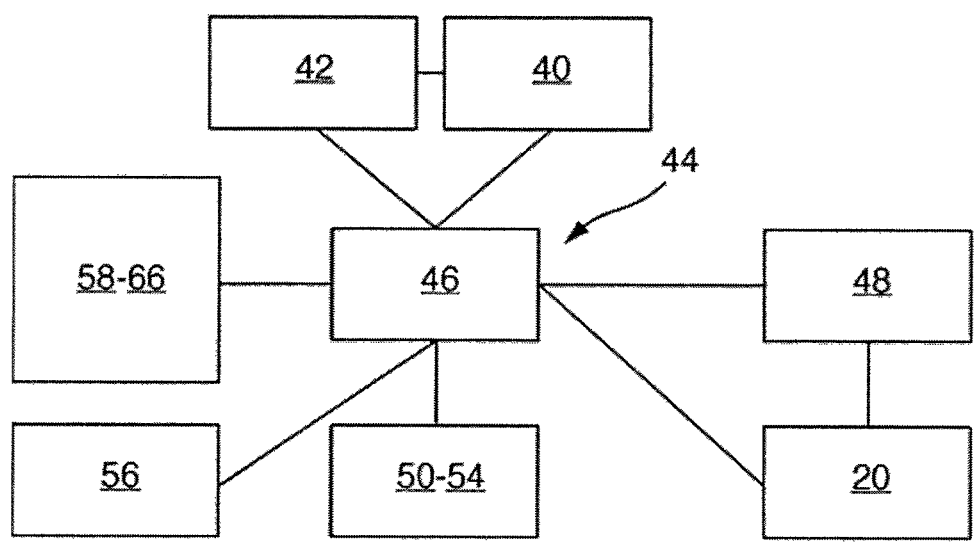

FIG. 5 a schematic, perspective partial view of the sliding rail with the sliding block guided within it of the mechanism according to FIG. 3, FIG. 6 an enlarged, schematic, sectional partial view of the sliding rail of the mechanism according to FIG. 3, and FIG. 7 a schematic representation of an exemplified embodiment of the electronic control unit of a respective mechanism according to the invention with a microcontroller and components connected to this.

FIGS. 1 to 7 show schematic representations of exemplified embodiments of a mechanism 10 according to the invention for influencing the opening and/or closing movement of a wing of a door, a window or the like.

The mechanisms 10 comprise in each case a sliding arm 12 disposed between the wing and a fixed frame (see FIGS. 3 to 5, which on one hand is rotatably supported on the wing or on the frame and on the other hand is guided by a sliding block 14 in a sliding rail 16 disposed on the frame or in a wing. With this, means 18 are assigned to the sliding rail 16 and/or the sliding block 14, through which the mechanical movement energy of the sliding block 14 can be converted into electrical energy and electrical energy generated in this way into mechanical energy, in order especially to supply at least one electrical component with electric current, to generate a braking torque and/or to drive the sliding block 14 at least in sections, especially to support the closing and/or opening movement.

The means 18 for energy conversion can especially comprise an electrical generator/motor unit 20 operable as both a generator and a motor as well as a gear drive 22 integrated in the slide rail 16 and/or in the sliding block 14, over which the sliding block 14 is coupled with the electrical generator/motor unit 20.

In FIGS. 1 and 2 an exemplified embodiment of a device 10 according to the invention is shown, in which the gear drive 22 comprises a threaded spindle 24 rotatably supported in the sliding rail 16 Here the sliding block 14 can cooperate with the threaded shaft 24 in the manner of a spindle nut.

The threading of the threaded shaft 24 can be interrupted in sections for corresponding free-wheeling.

As is particularly apparent from FIG. 1, the threaded spindle 24 in the present case extends over the total length of the sliding rail 16, wherein in the area of one of the two ends of the sliding rail 16 it is connected to the motor-generator unit 20, for example externally in the area of the corresponding front side of the sliding rail 16 In the area of the two frontal ends, the threaded spindle 24 is supported in the sliding rail 16, rotatably in each case in the present case, for example, the bearings 26 are present in end caps 28 of the sliding block 16.

In FIGS. 3 to 6, an additional exemplified embodiment of the mechanism 10 according to the invention is shown, in which the electrical generator/motor unit 20 is integrated in the sliding block 14 and the gear drive 22 comprises gear teeth 30 disposed in the sliding rail 16, with which a gear wheel 32 or the like supported rotatably in the sliding block 14 and coupled with the electrical generator/motor unit 20 meshes.

As shown, the gear wheel 32 supported rotatably in the sliding block can form part of a worm drive 36 disposed between the teeth 30 of the sliding rail 16 and an output shaft and/or a drive shaft 34 of the electrical generator/motor unit 20.

The worm drive 36 can comprise the gear wheel 32 supported rotatably in the sliding block 14 as the worm wheel and a helical screw 28 provided on the output shaft and/or drive shaft 34 of the electrical generator/motor unit 20, with which the gear wheel or worm wheel 32 engages.

For temporarily storing the electrical energy generated by the energy conversion means 18, an energy storage unit 40 of any desired type and/or a rechargeable electrical energy storage unit 42, for example a capacitor, a battery pack and/or the like may be provided (see FIG. 7).

The temporarily stored electrical energy can be used, for example, to drive the generator/motor unit 20 as a motor and to support the opening and/or closing movement of the wing during its opening and/or closing movement. Alternatively, or additionally, the temporarily stored electrical energy can also serve for supplying any desired electrical components with electric current.

The electrical generator/motor unit 20 can for example comprise a gear drive motor/generator. A generator/motor unit of this type can especially comprise a combination of a generator/motor unit that can be operated as both a generator and a motor and a gear drive.

In addition, a given mechanism 10 can also comprise an electronic control unit 44, over which the electrical generator/motor unit 20 and/or at least one other component can be actuated.

In this case, the electrical generator/motor unit 20 can be actuated over the electronic control unit 44 especially to influence the closing and/or opening movement of the wing.

In the area of its end away from the sliding block 14, the sliding arm 12 is preferably connected irrotatably with a drive shaft of a drive. For example, a drive of this type can comprise a piston interacting with the drive shaft and acted upon in the closing direction by a spring unit.

The gear drive 22 can be designed in such a manner, and/or the electric motor/generator unit 20 can be actuated by the electronic control unit 44 in such a manner that in at least one movement direction of the wing, free-wheeling takes place in sections between the sliding block 14 and the energy conversion means 18.

Through corresponding actuation of the electric generator/motor unit 20 via the electronic control unit 44, the drive behavior, especially the closing time characteristics, strengthening of the closing force or the like, can be controlled in the desired manner.

For example, the electronic control unit 44 can comprise at least one microcontroller 46 For example, it can be connected to at least one rotary pulse generator 48, at least one scanner 50, at least one switch 52, at least one sensor 54 and/or the like (FIG. 7). Here, the respective connection may be wired and/or wireless.

Alternatively, or additionally, the electronic control unit 44 for example may also comprise at least one communication interface 56 for wired and/or wireless communication (again see FIG. 7). In this process, for example, the electronic control unit 44 can be connected with at least one scanner provided on a controller or the like, and/or can communicate with at least one peripheral unit over a NFC or near-field communication connection and/or a Bluetooth connection and/or the like.

Through the energy conversion means 18, as respective electrical components, for example, power can be supplied to at least one electronic control unit 44, at least one electrical valve 58 assigned to the drive, at least one sensor 60, at least one signal generator 62, at least one optical generator and/or at least one acoustic signal generator, at least one lighting element 64, an electrical drive unit 66 assigned to the drive and/or the like (again see FIG. 7).

The design according to the invention enables, using a relatively simple assembly and correspondingly cost-advantageous manufacturing, in particular, easy and versatile control of the opening and/or closing behavior of the mechanism 10 Through the energy conversion means 18 integrated in or assigned to the sliding rail 16, it is possible both to generate energy for powering components and to dissipate energy from the drive or door closer to accomplish electrical damping. Thus, the hydraulic components previously required for damping the drive or door closer can be dispensed with. It is now possible, among other things, to control closing sequences electrically and/or to utilize the energy conversion means 18 as a drive for increasing or strengthening the closing force.

The respective implementation and execution of the gear drive 22 can be adapted to the respectively existing force relationships. In the gear drive 22, for example, free-wheeling is also possible, especially in one direction. The sliding block 14 is slid during opening and/or closing of the wing. During sliding of the sliding block 14, the rotary movement is transferred over the said gear drive 22 to the electrical generator/motor unit 20, which can also be operated as a motor, of this energy conversion means 18 If the power is transferred over a bypass back into the generator/motor unit 20 operated as a motor, the motor produces a braking torque that is transferred over the gear drive 22, the sliding block 14 and the sliding arm 12 to the piston of the drive, so that the drive or door closer, for example, can be electrically damped.

The electrical energy generated by the energy conversion means 18 can also be temporarily stored. Then, among other things, the stored energy can also be used to drive the motor and to support the opening and/or closing movement of the wing. For reliable closing of the wing, the closing force can be increased appropriately via the motor.

For example, if the gear drive 22 comprises a threaded spindle 24, the tooth system of the threaded spindle 24 can be interrupted in sections to produce the respective free-wheeling.

With the electrical energy generated via the energy conversion means 18, for example, the electronic control unit 44 or the microcontroller of this unit itself can supply electric components 58 to 66 or consumers such as electrical valves, signal generators, illumination elements and/or the like with power. Pulse generators, scanners and/or the like can supply the electronic control unit 44 or its microcontroller 46, for example, with information on the status of the drive or door closer. If the energy conversion means 18 are used for damping, opening, closing, and/or the like of the wing, the electronic control unit 44 or the microcontroller thereof 46 can adjust the motor power appropriately for the respective needs. Over at least one interface, the electronic control unit 44 or the microcontroller thereof 46 can exchange and/or obtain information and/or instructions to and/or from assigned components.

LIST OF SYMBOLS

10 Mechanism
12 Sliding arm
14 Sliding block
16 Sliding rail
18 Energy conversion means
20 Generator/motor unit
22 Gear drive
24 Threaded spindle
26 Bearing
28 End cap
30 Teeth
32 Gear
34 Output and/or drive shaft
36 Worm drive
38 Worm
40 Energy storage unit
42 Rechargeable energy storage unit
44 Electronic control unit
46 Microcontroller
48 Rotary pulse generator
50 Scanner
52 Switch
54 Sensor
56 Communication interface
58 Electric valve
60 Sensor
62 Signal generator
64 Illumination element
66 Electrical drive unit

The invention claimed is:

1. A mechanism (10) for influencing the opening or closing or both the opening and closing of a wing of a door or a window, with a sliding arm (12) disposed between the wing and a fixed frame, said arm being rotatably mounted on the wing or on the frame, and on the opposite side being guided by means of a sliding block (14) disposed in a sliding rail (16), wherein the sliding rail (16) or the sliding block (14) or both the sliding rail (16) and sliding block (14) have means (18) for energy conversion, through which mechanical movement energy of the sliding block (14) can be converted into electrical energy and electrical energy generated in this way can be converted into mechanical energy, in order to supply at least one electrical component (44, 46, 58-66) with electric current, to generate a braking torque or to drive the sliding block (14) at least in sections to support the closing or the opening or both the opening and closing of the wing of the door or the window.

2. The mechanism according to claim 1, wherein the means for energy conversion comprises an electrical generator or motor unit (20) operable as both a generator and a motor as well as a gear drive (22) integrated in the sliding rail (16) or in the sliding block (14) or both, over which the sliding block (14) is coupled with the electrical generator or motor unit (20).

3. The mechanism according to claim 2, wherein the gear drive (22) comprises a threaded spindle (24) rotatably supported in the sliding rail (16).

4. The mechanism according to claim 3, wherein the sliding block (14) cooperates with the threaded shaft (24) like a spindle nut.

5. The mechanism according to claim 3, wherein the thread of the threaded shaft (24) can be interrupted in sections for corresponding free-running.

6. The mechanism according to claim 2, wherein the electrical generator or motor unit (20) is integrated in the sliding block (14) and the gear drive (22) comprises gear teeth (30) disposed in the sliding rail (16), with which a gear wheel (32) supported rotatably in the sliding block (14) and coupled with the electrical generator or motor unit (20) meshes.

7. The mechanism according to claim 6, wherein the gear wheel (32) supported rotatably in the sliding block (14) can form part of a worm drive (36) disposed between the teeth (30) of the sliding rail 16 and an output shaft or a drive shaft (34) or both of the electrical generator or motor unit (20).

8. The mechanism according to claim 7, wherein the worm drive (36) comprises a gear wheel (32) as the worm gear and a helical screw (38) provided on an output shaft or a drive shaft (34) or both of the electrical generator or motor unit (20), with which the gear wheel or worm gear (32) engages.

9. The device according to claim 1, wherein for temporarily storing the electrical energy generated by the energy conversion means (18), an energy storage unit (40) or a rechargeable electrical energy storage unit (42) or both.

10. The device according to claim 1, wherein the electrical generator or motor unit (20) comprises a gear drive generator or motor.

11. The device according to claim 1, wherein the device comprises an electronic control unit (44), over which the electrical generator or motor unit (20) or at least one other component or both can be actuated.

12. The mechanism according to claim 11, wherein the electrical generator or motor unit (20) can be actuated over the electronic control unit (44) to influence the closing or the opening or both movements of the wing.

13. The device according to claim 1, wherein in the sliding arm (12) in the area of its end away from the sliding block (14), is irrotatably connected with a drive shaft of a drive.

14. The mechanism according to claim 13, wherein the drive can comprise a piston interacting with the drive shaft and acted upon in the closing direction by a spring unit.

15. The device according to claim 1, wherein the gear drive (22) or the electric generator or motor unit (20) or both can be designed in such a manner, or can be actuated by the electronic control unit (44) in such a manner that in at least one movement direction of the wing, free-wheeling takes place in sections between the sliding block (14) and the energy conversion means (18).

16. The device according to claim 1, wherein through corresponding actuation of the electric generator or motor unit (20) via the electronic control unit (44), the drive behavior, especially the closing time characteristics, strengthening of the closing force or the like can be controlled.

* * * * *